Nov. 12, 1946.  T. McG. AIKEN  2,410,919
PHOTOGRAPHIC FILM HOLDER
Filed April 10, 1945
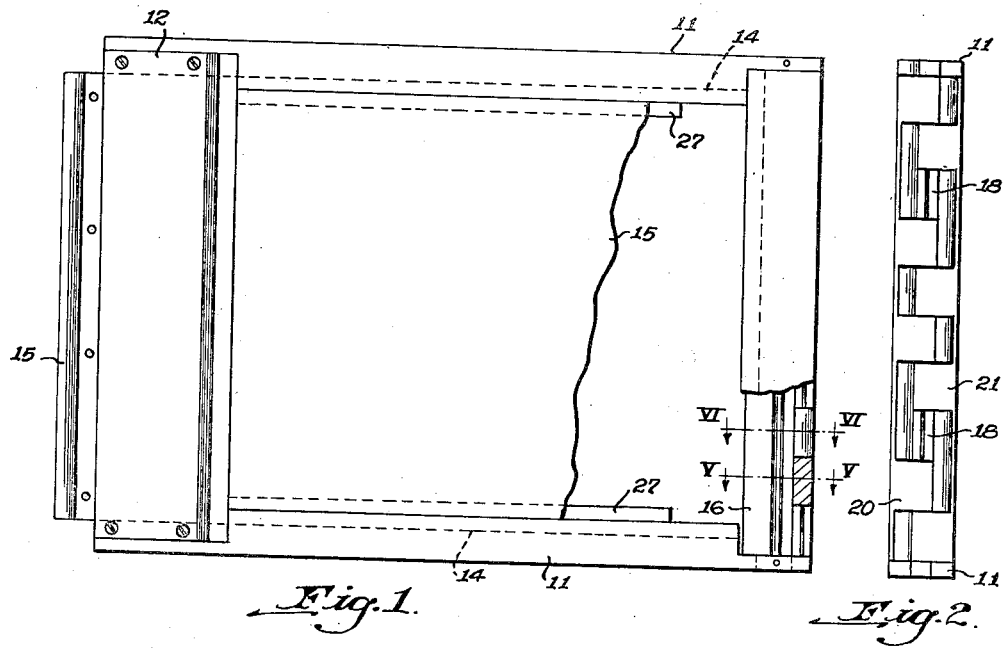
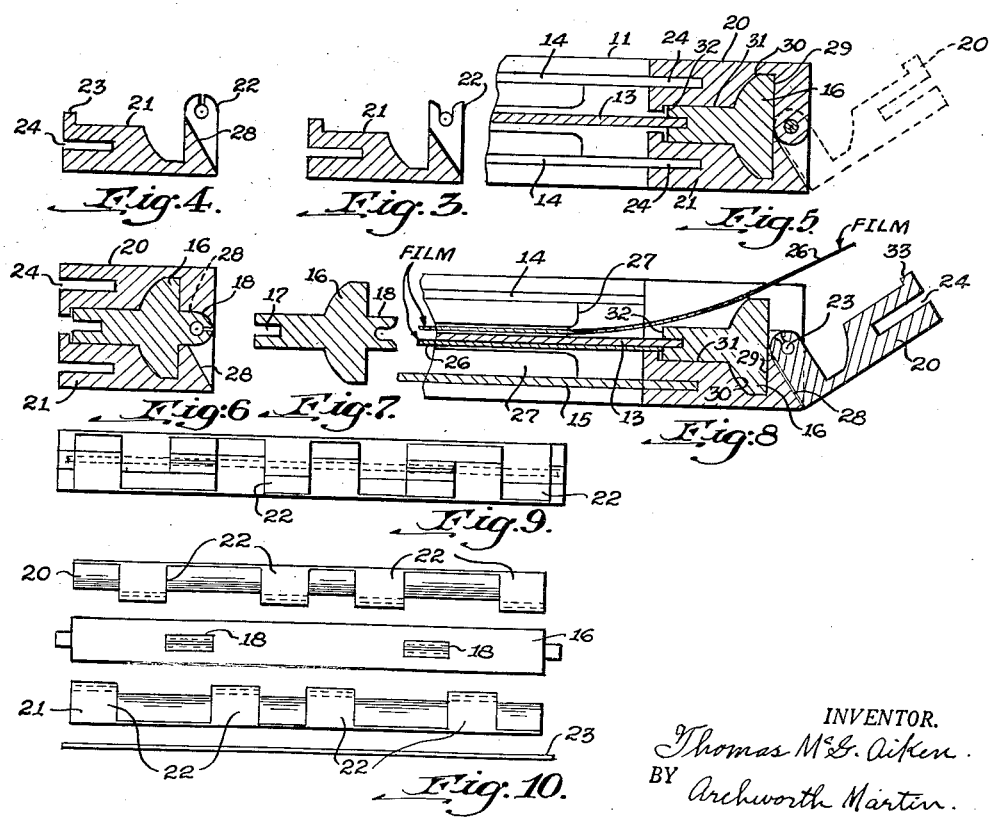
INVENTOR.
Thomas McG. Aiken.
BY Archworth Martin.
his ATTORNEY.

Patented Nov. 12, 1946

2,410,919

UNITED STATES PATENT OFFICE 2,410,919

PHOTOGRAPHIC FILM HOLDER

Thomas McG. Aiken, Pittsburgh, Pa.

Application April 10, 1945, Serial No. 587,561

5 Claims. (Cl. 95—66)

This invention relates to holders of the form generally designated as "plate holders" but is particularly suitable for use with cut films instead of plates.

One object of my invention is to provide a holder of the type referred to wherein the sheets of film can readily be inserted and removed without excessive bending of the film, and which can conveniently be manipulated in a totally dark room.

More specifically, my invention comprises hinged elements for opening and closing one end of a film holder, with such wide ranges of movement as to permit the more convenient insertion and removal of the films than in the case of certain film holders heretofore employed, and wherein the hinge connections of the elements are of sufficient rigidity and strength to retain proper alinement during long continued use, the closing elements being furthermore so mounted that they are not likely to be accidentally moved to closed position during the removal of an exposed film or the insertion of a new film.

In the accompanying drawing, Figure 1 is a plan view of a "film holder," partly in section; Fig. 2 is an end view thereof showing the hinged closure elements; Fig. 3 is an enlarged sectional view of one of the closure elements of Fig. 1, with its hinge knuckle partially formed; Fig. 4 shows the member with a knuckle completely formed; Fig. 5 is an enlarged view taken on the line V—V of Fig. 1; Fig. 6 is an enlarged view taken on the line VI—VI of Fig. 1; Fig. 7 is an end view of the end bar of the holder, to which the hinged closure elements are connected; Fig. 8 is a view showing the positions of certain of the parts and the manner in which a film is inserted or removed from the holder; Fig. 9 is a view showing the hinged closure elements and the bar in assembled relation, and Fig. 10 shows these members and their pintle in disassembled relation.

The holder frame is provided with the usual edge portions 11, end portion 12 and partition plate 13, and having grooves 14 for the reception of dark slides 15. These parts may be of conventional form and of any suitable materials.

I provide an especially formed member or bar 16 that is rigidly mounted between the side members 11 and is grooved at 17 to receive an end of the partition 13. Hinge knuckles 18 are formed on the bar. Hinged closure members 20 and 21 each here have four knuckles 22 formed thereon in position to be moved into axial alinement with one another and with the knuckles 18, to receive a pintle 23 so that the members 16, 20 and 21 are hingedly connected. The members 20 and 21 are each slotted at 24 to receive the ends of the dark slides 15 when the members are closed and the dark slides inserted.

The members 16, 20 and 21 may be made of any suitable material such as metal or molded plastic, by extrusion casting or cutting to the desired contours. In the present instance, they are of such form that they can be extruded in the shape of long bars which can then be cut to proper length after which the metal can be cut away at intervals to leave the knuckle-forming portions that may conveniently be in the form of slots as shown at 18 and 22 in Figs. 3 and 7. To complete these knuckles, a steel wire may be placed in the slots which will then be closed by a suitable squeezing operation to complete the knuckles as shown in Figs. 4 and 6. The wire can then be withdrawn and the pintle 23 inserted, whereupon these assembled members will be placed in position between the members 11 of the frame.

The members 20 and 21 are duplicates in form, so that not only is manufacture of these parts facilitated, but they are interchangeable.

An important feature of my invention resides in the fact that the hinged closure members are positioned on a common axis and can be swung open so widely as to present no interference to the insertion and removal of films 26 which are inserted in the holder between the parts 13 and the usual ribs 27 that hold the films flat near their longitudinal edges. It will thus be seen that the film does not need to be bent too greatly, with consequent danger of creasing or wrinkling as would be the case if the closure members 20—21 could not be swung far out of the way.

Furthermore since the holder is usually held in a generally horizontal position during replacement of a film and the uppermost closure member is opened during such operation, it will stay open through the force of gravity and is not likely to be accidentally closed. This is particularly convenient when loading the holder in total darkness. In other words, it will stay open after an exposed film has been removed from the holder and when loading with new film. The members 20—21 will be held closed by the slides 15 which enter the slots 24. The members 20—21 have cooperating inclined seating surfaces 28 formed thereon that engage one another when either of the closure members is in its open position. Again there is effective blocking off or sealing against the admission of light past the hinged members 20—21 to the interior of the holder by the enlarged portion of the generally T-shaped bar 16 and the angularly related surface at 29, 30, 31 and 32, and ribs 33 on the closure members hold the adjacent ends of the films 26 snugly against the partition. The curved surfaces at 30, on the closure members and the bar 16 are especially effective when the holder is closed, in preventing access of light even when there is some slight movement because of looseness of fit of these parts.

I claim as my invention:

1. A photographic film holder comprising a frame of generally rectangular form having a partition at its mid-plane and adapted to receive dark slides in perpendicularly-spaced relation to the faces of the partition, a bar forming an end portion of the frame and being of substantially greater thickness than the partition, and closure elements having axially alined knuckles pivotally connected by a pintle to the outermost edge of the bar, on a common axis, in position to cooperate with the said bar, when closed, to completely shut the adjacent end of the holder.

2. A photographic film holder comprising a frame of generally rectangular form having a partition at its mid-plane and adapted to receive dark slides in perpendicularly-spaced relation to the faces of the partition, a bar forming an end portion of the frame and being of substantially greater thickness than the partition, and closure elements having axially alined knuckles pivotally connected by a pintle to the outermost edge of the bar, on a common axis, in position to cooperate with the said bar, when closed, to completely shut the adjacent end of the holder, the outer edge of the bar being of greater thickness than the edge nearest the partition, and the closure elements having their inner faces recessed to closely fit against the bar when they are closed.

3. A photographic film holder comprising a frame of generally rectangular form having a partition at its mid-plane and adapted to receive dark slides in perpendicularly-spaced relation to the faces of the partition, a bar forming an end portion of the frame and being of substantially greater thickness than the partition, and closure elements pivotally connected to the outermost edge of the bar, on a common fixed axis, in position to cooperate with the said bar, when closed, to completely shut the adjacent end of the holder, the outer edge of the bar being of generally T-form with its stem engaged by the partition, and the closure elements being recessed to closely fit the T head when they are closed.

4. A photographic film holder comprising a frame of generally rectangular form having a partition at its mid-plane and adapted to receive dark slides insertible through one end of the frame and in perpendicularly-spaced relation to the faces of the partition, a pair of closure elements each having joint members rigidly secured thereto and hingedly connected on a common fixed axis at the other end of the frame, to respectively close the ends of the spaces at the sides of the partition, and means for preventing entrance of light past the hinge.

5. A photographic film holder comprising a frame of generally rectangular form having a partition at its mid-plane and adapted to receive dark slides insertible through one end of the frame and in perpendicularly-spaced relation to the faces of the partition, a pair of closure elements each having joint members rigidly secured thereto and hingedly connected on a common fixed axis at the other end of the frame, to respectively close the ends of the spaces at the sides of the partition, and means for preventing entrance of light past the ends, the said elements having such range of opening movement that they will lie out of the path of insertion and removal of a film.

THOMAS McG. AIKEN.